United States Patent [19]

Peier

[11] Patent Number: 5,160,008
[45] Date of Patent: Nov. 3, 1992

[54] ADJUSTABLE VISCOUS SHEAR COUPLING

[75] Inventor: Othmar Peier, Pöllau, Austria

[73] Assignee: Steyr-Daimler-Puch AG, Vienna, Austria

[21] Appl. No.: 822,594

[22] Filed: Jan. 17, 1992

[30] Foreign Application Priority Data

Jan. 22, 1991 [AT] Austria .................................. 122/91

[51] Int. Cl.⁵ .............................................. F16D 35/00
[52] U.S. Cl. ................................... 192/85 C; 192/57
[58] Field of Search ............... 192/57, 58 C, 70.14, 192/85 AA; 180/248, 249

[56] References Cited

U.S. PATENT DOCUMENTS

| | | | |
|---|---|---|---|
| 4,022,084 | 5/1977 | Pagdin et al. | 192/57 |
| 4,844,219 | 7/1989 | Stockmar | 192/58 C |
| 4,942,951 | 7/1990 | Kriebernegg et al. | 192/58 C |

FOREIGN PATENT DOCUMENTS 384086 9/1987 Austria .

*Primary Examiner*—Leslie A. Braun
*Assistant Examiner*—Nicholas Whitelaw
*Attorney, Agent, or Firm*—Marmorek, Guttman & Rubenstein

[57] ABSTRACT

An adjustable viscous shear coupling suitable for use in a high performance four-wheel drive vehicle comprises a housing containing a viscous fluid therein, a shaft extending into the housing, a set of outer disks non-rotatably connected to the housing, a set of inner disks non-rotatably connected to the shaft and interleaved with the outer disks, and an axially movable pressure piston which bears against the disks and adjusts the gap width between the inner and outer disks. One of the sets of disks is provided with frictional linings. The disks are brought to bear against each other in a controlled manner so that torque can be transmitted therebetween in a smooth, hump-less manner by a combination of frictional engagement and viscous shear.

7 Claims, 3 Drawing Sheets

ADJUSTABLE VISCOUS SHEAR COUPLING

BACKGROUND OF THE INVENTION

The instant invention relates to an adjustable viscous shear coupling which comprises a housing containing a viscous fluid, a shaft extending into the housing, external disks non-rotatably connected to the housing, internal disks non-rotatably connected to the shaft and extending between the external disks, and an axially movable adjusting piston to change the gap width between the disks, and in which no unregulated steep increase in torque occurs in any operational state of the viscous shear coupling due to a rise of internal pressure.

Adjustable viscous shear couplings are used in the drives of all-wheel drive vehicles, especially in vehicles with so-called permanent all-wheel drive. Such couplings are used mainly to establish the drive connection between the two driven axles, but sometimes also in lieu of intra-axle differentials.

Adjustable viscous shear couplings are used when a significant torque must be transmitted not only during off-the-road driving, but also during high speed road driving by a high performance vehicle, e.g., in sports cars, where it is desired that traction by all four wheels be utilized to accelerate the vehicle. In order to achieve this, a suitably sensitive adjustment of the transmitted torque is required and therefore an adjustable design for the viscous shear coupling is needed.

With the all-wheel drives normally used in off-the-road vehicles, a viscous shear coupling that is not adjustable through external intervention is adequate, because in such couplings heat and pressure rise with continuous slippage and, if the disks are designed accordingly, the so-called "hump" occurs. In this spontaneously occurring state of operation, disk pairs are brought to bear against each other so that mixed friction occurs leading to an uncontrolled and steep, although limited, increase of torque. It is limited because some slippage is still present even in this state of operation, so that the cooling action is greater than the heat loss occurring in the coupling, and effective overload-protection is achieved.

In the case of a regulated permanent all-wheel drive for high-performance vehicles to which the instant invention relates, however, conditions are basically different. The relationship between slippage and torque is generally adjusted through external modification of the distance between the disks so that the "hump" can be dispensed with, in fact must be dispensed with, because a spontaneously occurring process would interfere with the adjustment being made. At the same time, an adjustment range that is as great as possible is of course desired.

An adjustable viscous shear coupling in which the gap between the disks is adjusted by external means is known from AT-PS 384,086 (U.S. Pat. No. 4,844,219). Furthermore, it is known that in the viscous shear coupling of this patent, the adjustment range may be increased by filling the housing partially and by using a fluid of high viscosity. See, e.g., U.S. Pat. No. 4,942,951.

It is a disadvantage in such case, however, that the torque transmitted remains restricted as before when very little slippage occurs, and that no torque is transmitted if slippage tends towards zero. Furthermore, the automatic overload protection afforded by the "hump" does not apply, so that the coupling may be damaged due to overheating. Also, in the range of high torque forces, the adjustment range is also limited due to the fact that the disks come into contact with each other unevenly when the gap between them is drastically reduced, causing high disk wear. It is a further disadvantage that unavoidable leak losses which occur over the long term alter the characteristics of the coupling thus affecting operating safety.

A viscous shear coupling having friction linings on the disks is known from U.S. Pat. No. 4,022,084 (Pagdin et al.). However, the viscous shear coupling disclosed therein is a non-adjustable coupling which permits the "hump" to occur. The effect of the friction linings is only to increase further the torque transmitted in the "hump state," but without ever enabling the coupling to transmit torque without slippage, and therefore without wear.

It is therefore the object of the instant invention to develop further an adjustable and "hump-less" viscous shear coupling suitable for use in a high performance, four wheel drive vehicle in such a manner that a wide adjustment range which does not change over time is available even with very little slippage, and in which torque can be transmitted entirely without slippage even in continuous operation.

SUMMARY OF THE INVENTION

This object is attained in accordance with the present invention which provides an adjustable viscous shear coupling for a high performance four wheel drive vehicle, comprising: a housing containing a viscous fluid, a shaft extending into the housing, a set of external disks non-rotatably connected to the housing, a set of internal disks non-rotatably connected to the shaft and interleaved with the set of the external disks, and an axially movable pressure piston bearing against the sets of disks so as to change the gap width between them, wherein the disks of at least one of the sets of disks includes friction linings on their faces and wherein the disks can be brought to bear against each other in a controlled manner so that torque will be transmitted without occurrence of a hump.

This arrangement makes it possible to utilize the gripping action of all four wheels for maximum traction with an engaged coupling. However, additional advantages are also attained: by increasing the performance characteristics (due to the contribution of frictional engagement of the disks), the coupling can be manufactured in a smaller size for a given maximum torque requirement. The overall performance loss and thereby the energy loss is also considerably lower than in conventional shear couplings. Moreover, compared to a simple friction coupling, the advantage of low wear is achieved since considerable torque, sufficient under non-extreme driving conditions, is transmitted thanks to the viscous shear effect, even before or without any application of pressure by the friction linings.

It has been shown that when friction and viscous shear interact in accordance with the instant invention while size is furthermore kept smaller, the transition from viscous shear mode to friction mode is smooth, thus facilitating control by the pressure piston.

Furthermore, the occurrence of leakage does not lead to any change in the transmission behavior of the coupling. Since leakage causes a drop of the internal pressure, this can be overcome by applying a greater axial force to the friction linings. As the friction linings are worn, the minimum distance between disks is further reduced, causing the viscous shear effect to remain on its original performance curve.

In a further embodiment of the invention, the frictional surfaces of the friction linings are developed as circular ring-shaped zones, the surfaces of which are equal to approximately one third of the effective disk surface areas and which protrude only minimally in the axial direction beyond the remaining effective disk surfaces. In this case, a viscous shear effect will continue to occur even after the frictional surface of one disk comes into bearing contact with the frictional surface of an opposing disk. Furthermore, the frictional surfaces themselves also act as viscous shear surfaces for as long as they do not bear against the counter-disks.

In another embodiment of the invention, the friction linings are installed in tapped recesses of the disks. The friction linings can then be made with a thickness which is best suited for strength and heat resistance, and with a sufficient gap width for the transmission of torque through viscous shear.

In another embodiment of the invention, the friction linings extend over a major part of the effective disk surfaces and are provided with circular shoulders delimiting the friction linings. The disks (which are actually only friction lining supports in this case) can then be made much thinner and without depressions, yet a sufficiently narrow gap width can nevertheless be achieved in the friction lining zone reserved for viscous shear. This is possible only in adjustable viscous shear couplings not having a "hump", as those which have a "hump" are provided with slits or perforations to ensure that this occurs.

In a further variant of this embodiment, it is possible to provide yet another circular frictional surface on the inner portion of the friction linings. Thanks to this measure, the disks can be very thin even for a coupling under heavy load because deformations caused by thermal conditions and load are prevented by the bearing contact in the inner and in the outer zones.

A frictional lining made of a material containing paper has proven to be especially well suited and compatible with the viscous fluid in such couplings. Additionally, the frictional surface of the frictional lining can also be profiled.

BRIEF DESCRIPTION OF THE DRAWINGS

The invention is described in further detail below by reference to the drawings, wherein.

DETAILED DESCRIPTION OF PREFERRED EMBODIMENTS

Figure 1:
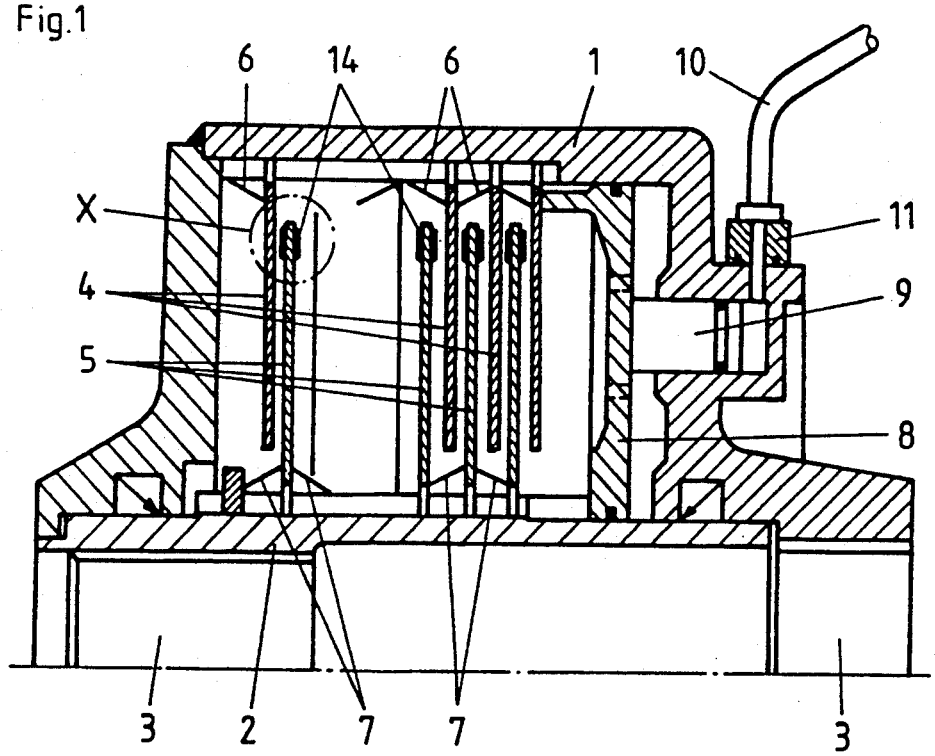
FIG. 1 shows in axial section the upper half of a first embodiment of a viscous shear coupling according to the instant invention.

The viscous shear coupling shown in FIG. 1 comprises an outer part 1, namely, a fluid-tight housing, and an inner part 2, namely, a shaft, freely rotatable within the housing. These two elements are provided with splined shaft gears 3 or similar devices for the non-rotatable connection to a drive or drive shaft (not shown). In particular, housing element 1 can be fixedly held in place in this embodiment and can be connected to the housing of a planetary gear system (not shown). In such case, no drive shaft is needed.

The outer disks 4 and the inner disks 5, constituting two coaxial intermeshing sets, serve here as coupling links between the outer part or coupling element 1 and the inner part or coupling element 2. The disks 4 are connected non-rotatably but axially movably as outer disks to the outer coupling element 1 and the disks 5 as inner disks to the inner coupling element 2. Between the outer disks 4 and the inner disks 5, ring-shaped Belleville spring washers 6,7 are inserted and spread the disks 4,5 apart while keeping the distances between them uniform. In the housing element 1, a pressure piston 8 moves slidingly and presses against the outer and inner disks 4,5 to adjust the distance between the disks against the force of the Belleville spring washers 6,7. The pressure piston 8 is shifted by means of the adjusting piston 9 (as a rule there may be several of these, but only one is shown here) which is subjected to pressure by means of a source of hydraulic pressure through a circuit 10 and via a slip ring 11 which can be omitted in case of a fixed housing. The inner disks 5 are provided on both sides with friction linings 14 which shall be discussed in greater detail below.

Figure 2:
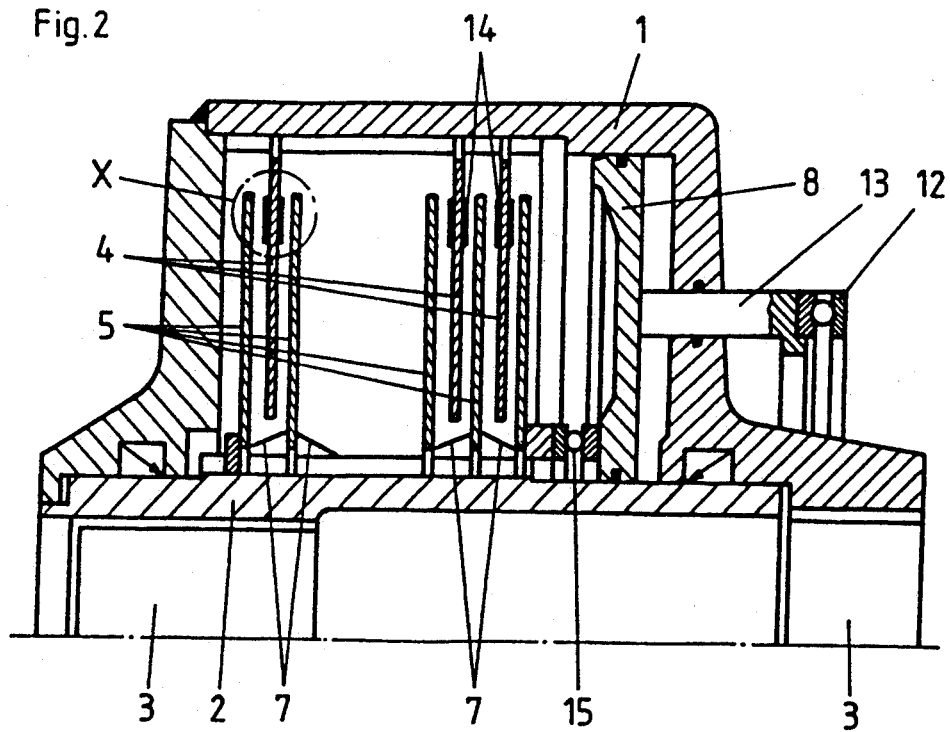
FIG. 2 shows the same in a second embodiment.

A preferred variant of the embodiment according to FIG. 2 differs from that of FIG. 1 insofar as the pressure piston 8 acts via an axial depression 15 upon the inner disks 5 against the force of a single set of Belleville spring washers 7, and insofar as the piston 8 is not shifted hydraulically, but via a pressure ring 12 and a finger 13 which are parallel to the axis. This embodiment also differs from the previous one in that the outer disks 4 are provided here with friction linings 14.

Figure 4:
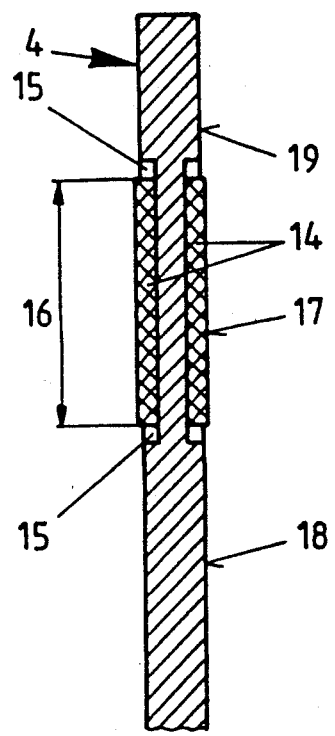
FIG. 4 shows details of the region X of FIGS. 1 or 2 greatly enlarged.

FIG. 4 shows in detail a first embodiment of the friction linings 14 on an outer disk 4 of FIG. 2, the inner disks 5 not being provided with friction linings in this embodiment. The dimensions of the friction linings 14 and the surface area they occupy are the same as the friction linings on the inner disks 5 shown in the embodiment of FIG. 1, the outer disks 4 in that case being without friction linings. In any case, all outer disks 4 are identical and so are all the inner disks 5 and any desired number of disk pairs can be provided as required. The outer disks 4 shown in FIG. 4 have circular ring-shaped depressions on their outer surfaces in which the friction linings 14 are attached, e.g., by adhesion. The friction linings 14 may be circular and ring-shaped in this instance or may consist of several portions (see, e.g., FIG. 7).

It can be seen from FIG. 4 that the frictional surfaces 17 of the friction linings 14 occupy only a narrow portion of radial width 16 of the disks 4, the frictional surfaces 17 having a surface area equal to approximately one-fifth to one-third of the total effective disk surface area. Furthermore, the friction linings 14 protrude only minimally in the axial direction beyond the faces 18,19 of the disks 4 (overhang of about 0.2 mm). Thus, the faces 18,19 are still able to transmit torque through viscous shear even when friction linings 14 bear against the inner disks 5, i.e., coupling due to frictional engagement and viscous shear. When the inner disks 5 and the outer disks 4 do not touch each other, all the faces 18,19 and the surfaces 17 of the friction lining 14 are available for transmission of torque through viscous shear. The radial width 16 of the friction linings 14 should be optimized to the design of the coupling.

Figure 5:
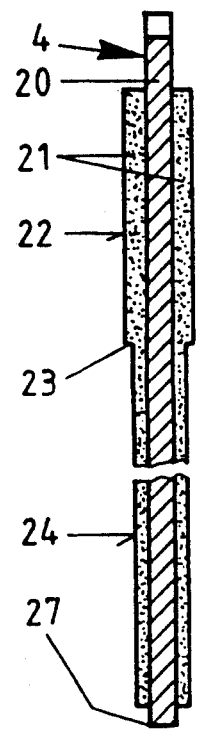
FIG. 5 shows the same as FIG. 4 in a further embodiment.

FIG. 5 shows another embodiment of the friction linings through the example of an outer disk 4. The latter comprises in this case a thin plate 20. Friction linings 21 are attached to both sides of plate 20, for example, by adhesion. Friction linings 21 have a first zone constituting the frictional surfaces 22 and, separated by a shoulder 23, a recessed zone 24 which can reach substantially as far as the inner edge 27 of the outer disk 4. In this construction, the production of a recess in the disk face through milling or tapping is not necessary as in the embodiment of FIG. 4. The slight thickness of the plate 20 constituting the disk 4 is possible because it is protected from wear by the friction linings 21 and also because the disk in a viscous shear coupling without "hump" need not be provided with slits or perforations. Additionally, the thermal load is considerably lower in this case because of the possibility of frictional engagement of the coupling.

Figure 6:
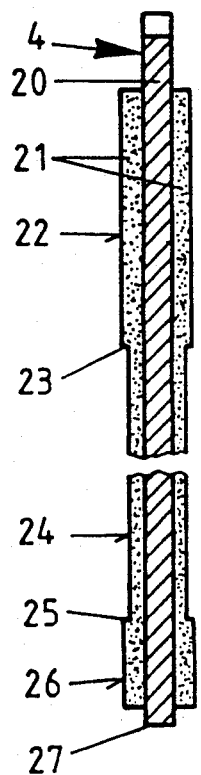
FIG. 6 shows the same as FIG. 4 in yet another embodiment.

In the embodiment of FIG. 6, the recessed zone 24 of the friction linings 21 has an additional projecting frictional surface 26 delimited by a shoulder 25, said frictional surface 26 also bearing against the opposing inner disk 5 when the coupling is engaged. This allows for greater load on the disks in addition to higher bearing pressure via piston 8. In general, the friction linings 14 can be distributed over the shear surfaces (18,19 in FIG. 4) in any desired manner.

Figure 7:
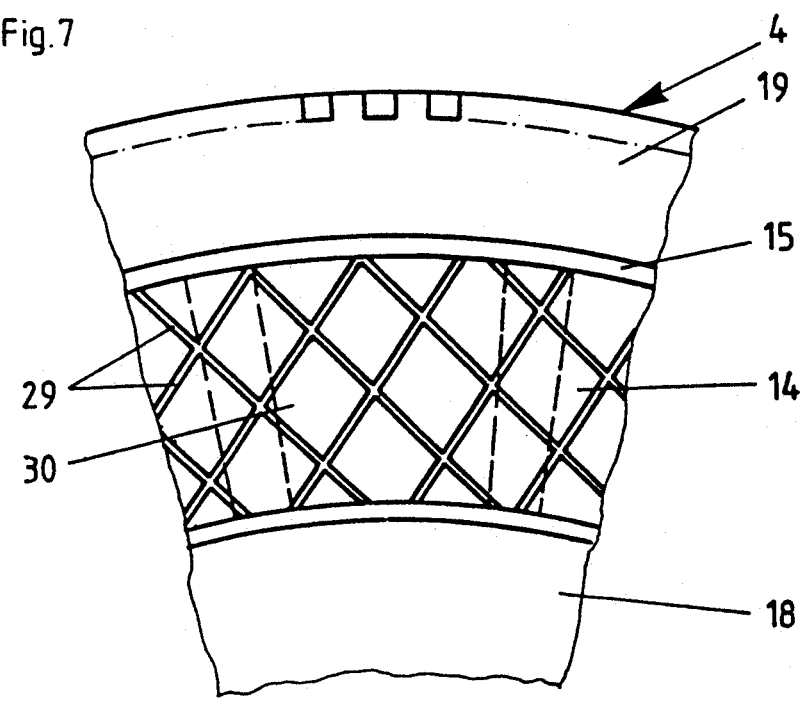
FIG. 7 shows a further detail of FIG. 4.

FIG. 7 shows a view along the axial direction of an outer disk 4 in which the friction lining 14 is provided with grooves 29 that intersect each other in a further development of the invention. Another variant in which the friction lining 14 comprises individual friction surfaces 30 is shown in broken line.

Figure 3:
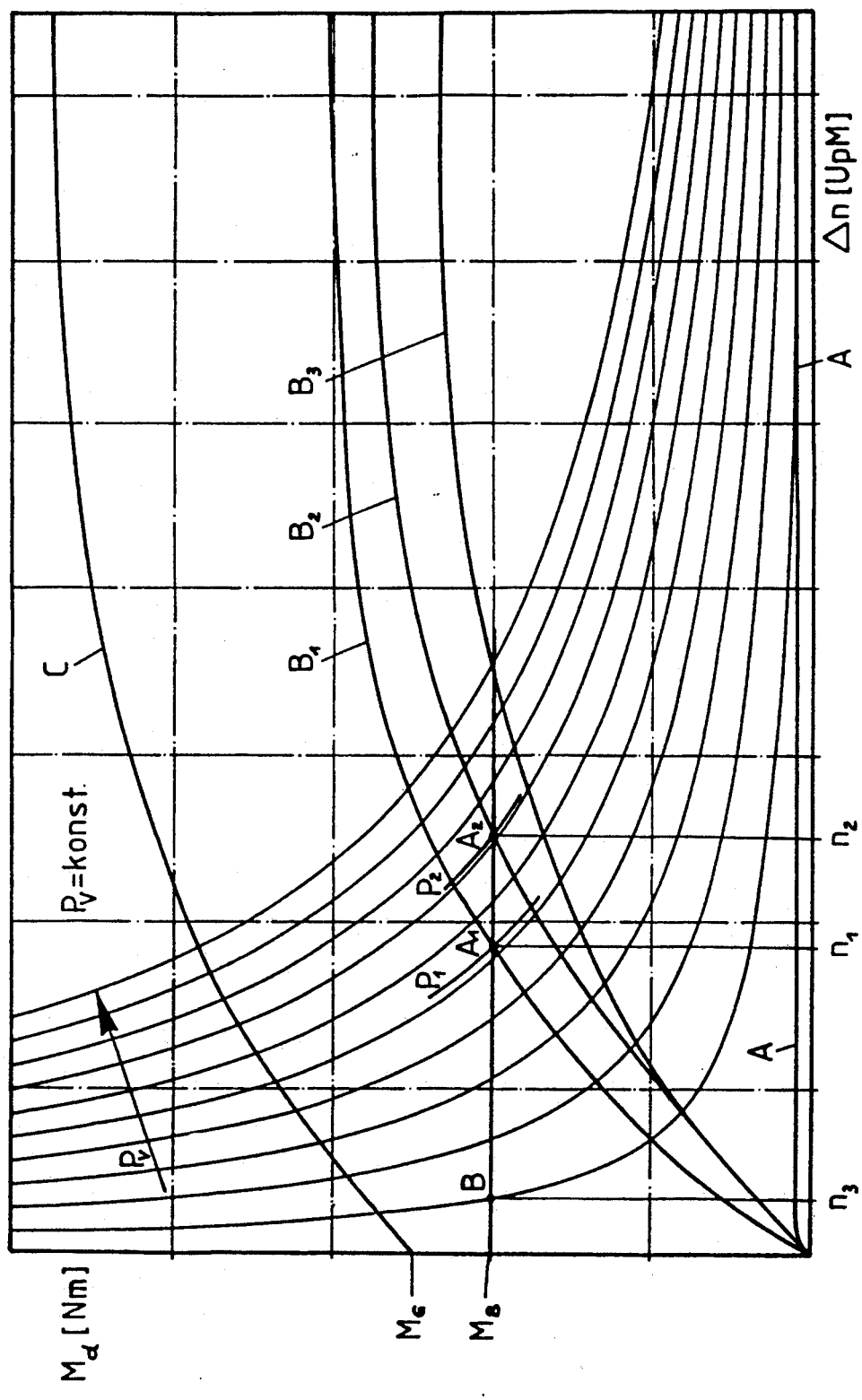
FIG. 3 is a graph illustrating the relationship between torque and slippage applicable to viscous shear couplings according to the prior art and according to the instant invention.

The action of the viscous shear coupling according to the instant invention is compared with a conventional viscous shear coupling in FIG. 3.

FIG. 3 depicts a graph for a viscous shear coupling in which slippage $\Delta n$ (the rotational speed difference between the shaft 2 and housing 1 of the coupling) is represented on the abscissa, and the transmitted torque $M_d$ on the ordinate. Curve A in this graph represents a purely viscous shear coupling with maximum gap width, while curves $B_1$ and $B_2$ represent purely viscous shear for a conventional coupling with minimum gap width ($B_1$ being at a lower temperature than $B_2$). Curve $B_3$ represents purely viscous shear for a viscous shear coupling of the present invention. (Note that curve $B_3$ is below curve $B_1$ because of the reduced viscous shear effect when disk surfaces are partly covered with friction linings.) Curve C represents a viscous shear coupling according to the instant invention with the minimum gap width and with the full effect of the friction linings. The field between curves A and C therefore represents the total adjusting range of a viscous shear coupling according to the instant invention, while the field between the curves $B_3$ and C represents the mixed effect of viscous shear coupling and frictional engagement, the friction linings taking effect above curve $B_3$. The field between curves A and B on the other hand represents the operating range of a conventional adjustable viscous shear coupling without friction linings.

FIG. 3 also includes a set of curves for constant dissipated energy or heat loss ($P_v$=const.) under different conditions in a viscous shear coupling.

An adjustment program can set different points of dissipated energy (heat loss) for a set of torque requirements (e.g., for a torque $M_B$). For the torque requirement $M_B$, point A represents the point of minimum dissipated energy of an adjustable viscous shear coupling according to the prior art, i.e., an adjustable shear coupling not having friction linings. In real life, this means that in a high performance four-wheel drive vehicle, the gripping action of the wheels on the shaft downstream of the viscous shear coupling is not utilized until $\Delta n$ equals $n_1$ because prior to that all of the energy is dissipated as heat loss. If this load condition lasts for a period of time, the temperature of the viscous fluid, e.g., silicone oil, rises from $t_1$ to $t_2$ causing a drop from the curve $B_1$ to $B_2$. For the torque requirement $M_B$ to be met, the differential rotational speed $\Delta n$ must increase from $n_1$ to $n_2$ and the dissipated energy from $P_1$ to $P_2$ to reach the operating point $A_2$. The temperature would then continue to rise and the coupling could overheat and be destroyed.

However, in a viscous shear coupling according to the instant invention wherein the disks have friction linings, an adjustment can be effected so that frictional engagement occurs in such manner that the required torque $M_B$ is delivered at the drive-dynamic lowest differential rotational speed (point B at $\Delta n = n_3$). The points of minimum dissipated energy can also be taken into account in the adjustment program, and they are represented by the limit curve C of the performance characteristic. Thus, the inventive coupling can also be adjusted for zero dissipated energy, and this means a rigid through-drive. The torque delivered in this case, $M_G$, is the maximum torque transmissible from a combination of frictional engagement and viscous shear. If the required torque $M_B$ exceeds $M_G$, then rigid through-drive is no longer possible. However, $M_G$ is generally a very high value so that this situation will seldom occur. In practice, this means that the coupling according to the instant invention can be fully engaged when maximum traction of all four wheels is required for full acceleration of the vehicle.

The viscous shear coupling according to the invention is therefore superior in all driving states (except for braking, for which in any case special measures are necessary) to one according to the prior art, while wear and performance loss are lower and operating safety is greater.

While the invention has been described by references to specific embodiments, this was for purposes of illustration only. Numerous alternative embodiments will be apparent to those skilled in the art and are considered to be within the spirit and scope of the invention.

I claim:

1. An adjustable viscous shear coupling suitable for use in a high performance four wheel drive vehicle, comprising
    a housing containing a viscous fluid therein,
    a shaft extending into said housing,
    a set of outer disks non-rotatably connected to said housing,
    a set of inner disks non-rotatably connected to said shaft, said inner and outer disks being interleaved and having a gap width therebetween,
    an axially movable pressure piston bearing against said disks to adjust the gap width between said inner and said outer disks,
    one of said sets of inner and outer disks including surfaces having friction linings thereon, said inner and outer disks being brought to bear against each other in a controlled manner so that torque can be transmitted in a hump-less manner by a combination of frictional engagement and viscous shear.

2. The adjustable viscous shear coupling of claim 1 wherein said friction linings comprise annular zones on said disk surfaces, said annular zones covering only a portion of said disk surfaces, said friction linings extending slightly beyond said disk surfaces in an axial direction.

3. The adjustable viscous shear coupling of claim 1 wherein said disk surfaces have recessed areas, said friction linings being located within said recessed areas.

4. The adjustable viscous shear coupling of claim 2 wherein said annular zones comprise a major portion of said disk surfaces, said friction linings including shoulders which delimit frictional surfaces of said friction linings.

5. The adjustable viscous shear coupling of claim 2 wherein said friction linings comprise a plurality of separated annular zones on said disk surfaces.

6. The adjustable viscous shear coupling of claim 2 wherein said friction linings are made from an organic material containing paper.

7. The adjustable viscous shear coupling of claim 2 wherein said frictional linings contain grooves therein.

* * * * *